M. C. FRENCH.
BRUSH PLOW.
APPLICATION FILED SEPT. 29, 1914.
1,153,213.
Patented Sept. 14, 1915.
2 SHEETS—SHEET 1.
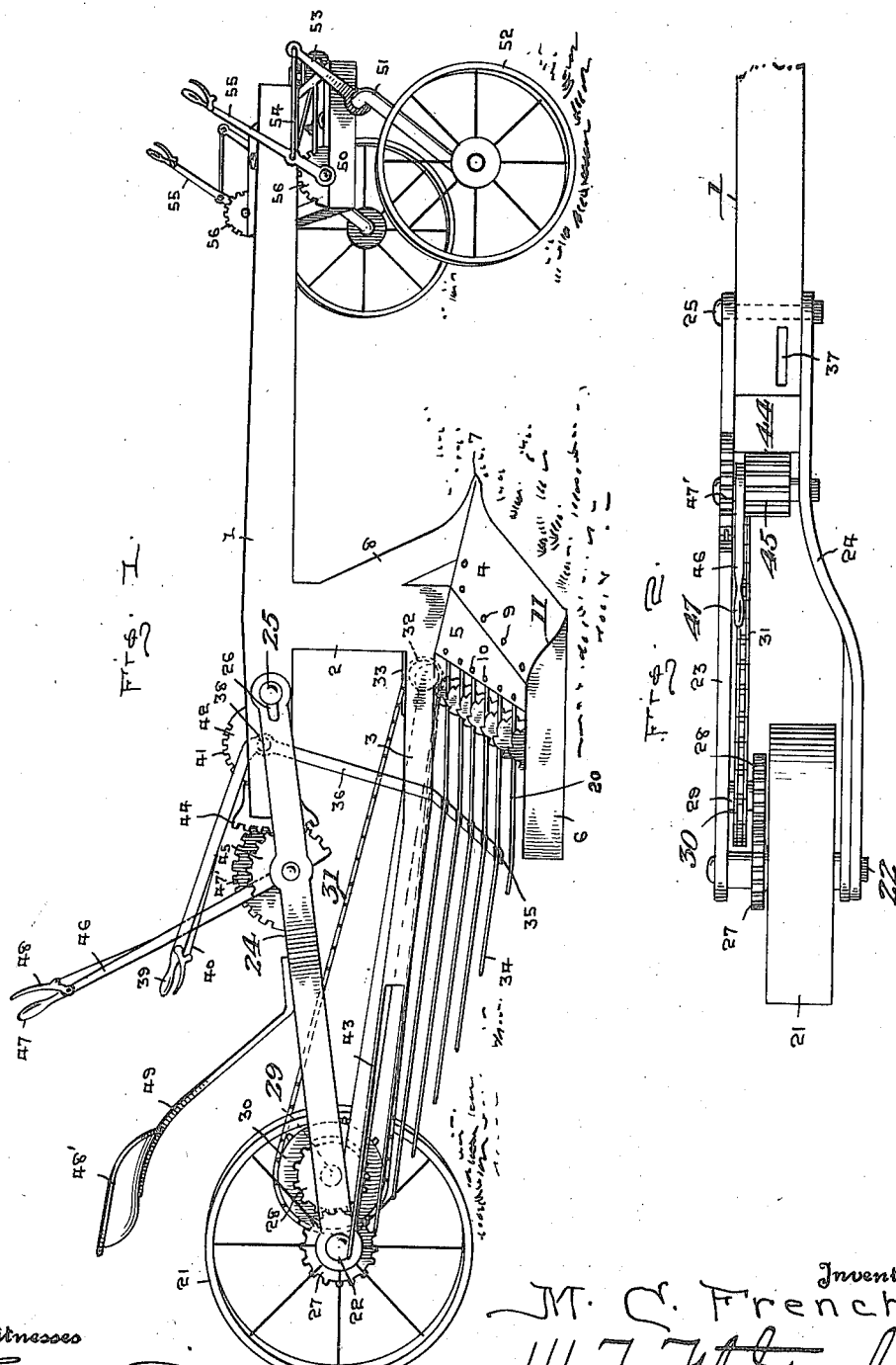
Witnesses
Edward H. Young
Inventor
M. C. French
By M. J. Fitzgerald
Attorneys

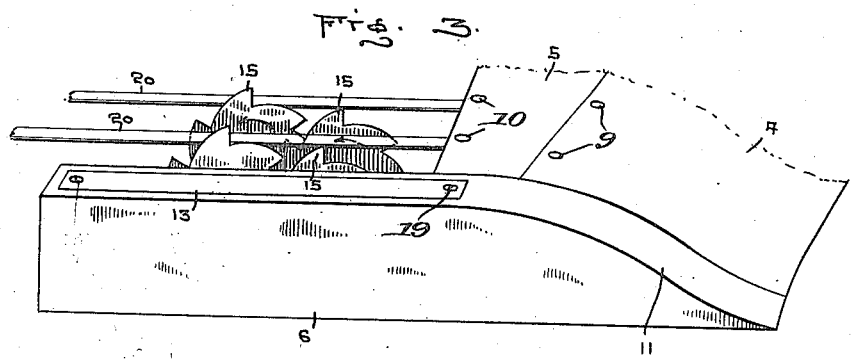
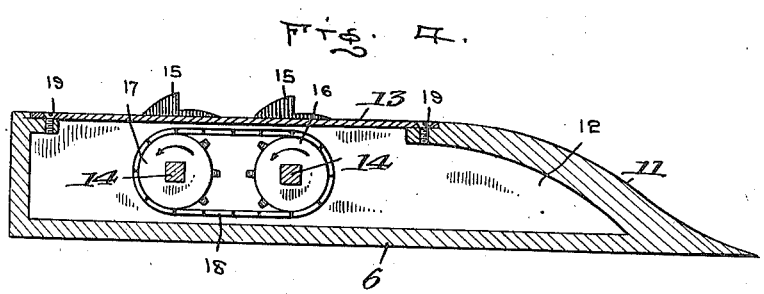
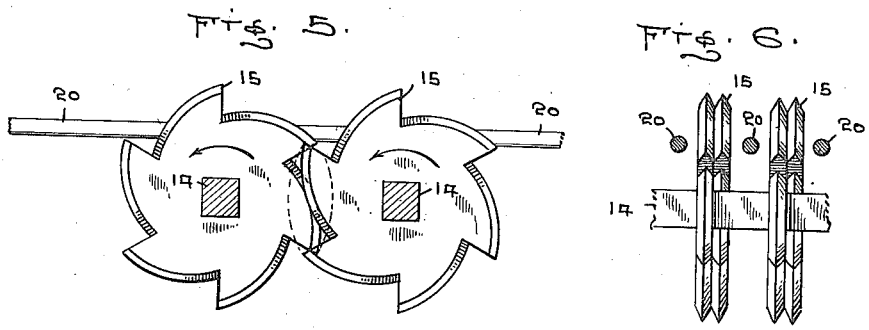

UNITED STATES PATENT OFFICE.

MORGAN C. FRENCH, OF YAMPA, COLORADO.

BRUSH-PLOW.

1,153,213. Specification of Letters Patent. Patented Sept. 14, 1915.

Application filed September 29, 1914. Serial No. 864,025.

*To all whom it may concern:*

Be it known that I, MORGAN C. FRENCH, a citizen of the United States, residing at Yampa, in the county of Routt and State of Colorado, have invented certain new and useful Improvements in Brush-Plows; and I do hereby declare the following to be a full, clear, and exact description of the invention, such as will enable other skilled in the art to which it appertains to make and use the same.

This invention relates to plows and more particularly to brush plows especially adapted to clear the land of brushes, shrubbery and roots as well as to break the soil.

One of the objects of this invention is to give a device that will readily clear the land of roots, shrubbery, etc.

Another object of this invention is to break or crush the soil of the land to be plowed. And a still further object of this invention is to combine the breaking and crushing of the soil with the clearing out of roots, shrubbery, etc.

Other objects and advantages of this invention will be hereafter more clearly set forth in the specification and pointed out in the claims.

Similar characters of reference refer to similar parts throughout the specification and drawings in which—

Figure 1 is a perspective elevation of my device in assembled formation. Fig. 2 is a top plan view of the rear portion thereof and showing in part the driving arrangement. Fig. 3 is a detail in part of the plow crushing disks and clearing bars. Fig. 4 is a sectional elevation of the parts shown in Fig. 3. Fig. 5 is a detail showing the mounting of the crushing disk with relation to the clearing bars, and Fig. 6 is a detail looking at right angles to that shown in Fig. 5.

In Fig. 1 of the drawings the carrying device includes a plow beam 1 including the standard 2 and integrally connected to the lower end of the standard 2 and projecting rearwardly therefrom is a land side plate 3.

Connected to the lower end of my standard and projecting horizontally therefrom is my main plow construction consisting of a plow share 4, a plate or mold board 5 and a land side 6. The plow share 4 has the usual plow point 7 and in part is formed by means of the plow like brace 8 bracing the plow share 4 in position, and said plow share is bolted as at 9 to the mold board 5 and to suitable frame work beneath. Likewise the upper edge portion of the mold board 5 is bolted as at 10 to the frame work, said parts being assembled substantially as shown in Fig. 1. The land side 6 has a forward sloping edge portion 11 corresponding to the slope of the plow share and mold board 5 and consists of a hollow chamber 12 inclosed by a suitable cover 13, the ends of the shafts 14 carrying a plurality of crushing disks 15 at their end portions projecting within the chamber 12.

Suitable gear wheels 16 and 17 are mounted upon the ends of these shafts 14 within the chamber 12 and are connected into running operation by means of an endless chain 18, said chain operating to rotate the shafts 14 in unison and in the same direction. In this respect it might be said that the shafts and crushing disks 15 are not limited to any particular number but one or more can be used as is desired or preferred, in this instance two being shown as giving the preferred form. These gear wheels 16 and 17 and chain 18 are completely sheltered by the chamber 12 and the cover 13 is suitably fastened in place by means of counter sunk screws 19 as plainly shown in Fig. 4 of the drawings.

The crushing disks 15 bear a staggered relationship to each other and allow of the positioning of the horizontal guard or clearing rods 20 therebetween, said rods being connected in any suitable manner beneath the plow share and mold board 5 and projecting in a rearward direction parallel with the land side 6, these guards or clearing rods operating to separate the roots and shrubbery from the soil. The rear portion of the plow comprises a gage wheel 21 mounted upon a suitable shafting 22 which is mounted for this purpose within a pair of beam extensions 23 and 24 which are pivotally mounted for sliding engagement on the beam 1 by means of a pivot pin or bolt 25 operating through the slots 26 as plainly shown in Figs. 1 and 2 of the drawings, the beam extension 24 being suitably offset to allow of the assembling of parts to be hereinafter described in detail. The gage wheel 21 rigidly carries upon its shaft a cog 27 which in turn meshes with and drives a cog gear 28 suitably mounted upon a shaft 29 in the beam extension 23. Rigidly mounted on the shafting 29 and driven by the cog gear 28 is a sprocket wheel 30 driving a sprocket chain 31 which operates a second sprocket wheel 32 connected to the opposite end of one of the shafts 14 from that end which carries the gear 16, said chain operating sprocket wheel 32 to rotate the crushing disks 15. The sprocket wheel 32 is suitably housed for protection for this purpose between the outer surface of the land side 3 and a parallel wall 33 as shown in Fig. 1 of the drawings.

Each of the rods 20 has a rear removable extension rod 34, the ends of which are suitably sleeved over the ends of the rods 20. These extension rods 34 are fastened to the horizontal portion 35 of the bell crank lever 36. This bell crank lever is mounted through a suitable slot 37 within the plow beam 1 and pivoted thereto by means of a pivot pin or bolt 38, the upper end of the bell crank lever comprising a handle 39 having a locking means 40 thereon adapted to engage the teeth 41 of a quadrant 42 suitably mounted upon the beam 1 to adjustably lock the bell crank lever 36 at a desired position, the moving of the bell crank lever 36 extending and raising the rear rods 34 for a purpose hereinafter described.

Suitable rods 43 in a horizontal position but vertically disposed are extended from the land side 3 previously noted, said rods 43 preventing displacement of the roots and shrubbery from off of and to one side of the rods 34. The end of the beam 1 has a rack 44 upon it and is engaged by a suitable quadrant 45, said quadrant being operated by means of a handle 46 to raise or lower the beam extensions 23 and 24 and consequently the gage wheel 21. This allows of a different depth in the breaking of the land.

The lever 46 has a suitable handle 47 upon the end, and adjacent thereto, a locking means 48 to lock the lever 46 in any desired position by means of a quadrant 47'. This lever is within the vicinity of easy reach from a seat 48' suitably mounted by means of a support 49 attached to the beam extensions 23 and 24.

A fifth wheel arrangement 50 supports the front end of the beam 1 for pivotal movement and carries therein suitable offset axles 51, said axles carrying gage wheels 52. Each of the axles 51 has a crank extension in the opposite direction to the offset portion of the axle, and these cranks are connected by means of links 54 to manipulating handles 55 operated to raise and lower the gage wheels, and consequently the depth of the plow. These levers are locked in adjusted position by means of quadrant arrangements 56.

In operation, my gage wheels are first adjusted to allow the plow to operate in the desired depth; when upon a forward movement of the plow the soil is plowed up and spread over the plow until it reaches the rotating crank disks 15 which break and crush the soil. At the same time the rods 20 operate to prevent roots and shrubbery from falling back into the soil, said roots and shrubbery being pushed rearwardly as fresh material is pushed upon the rods. In case of the clogging of the roots and shrubbery upon these rods the rear extensions 34 of the rods are elevated by means of the bell crank lever 36 thereby clearing the rods of the accumulation, said bell crank lever being locked in extended position by means of the quadrant 42, as is desired.

Having thus fully described my invention what I claim as new and desire to secure by Letters Patent is:

1. A plow construction comprising a beam, a standard fixed to said beam, a land side integral with and projecting from said standard, a plow share attached to said standard, a mold board connected to said plow share, a second land side connected to the end of the plow share and mold board, said second land side having a hollow chamber therein, a plurality of disks in the rear of said plow share and mold board, means to rotate said disks in unity, and means to separate roots from the soil after leaving said disks.

2. A plow comprising a beam, a standard to said beam, a landside integral with and rearwardly projecting from said standard, a plow share attached to said standard, a mold board connected to said plow share, a second land side connected to the ends of said plow share and mold board, and means to crush and break the soil and to separate the roots and shrubbery therefrom.

3. A plow comprising a plow beam, a standard thereto, a plow attached to said standard, a plow brace integral with said standard and bracing said plow, and means to crush the soil and separate the roots from said soil in the rear of said plow.

4. A plow comprising a plow beam, a standard, a plow, a plurality of landsides vertically disposed and at each side of said plows projecting rearwardly therefrom, shafts mounted between said land sides, a plurality of crushing and breaking disks mounted upon said shafts in staggered relationship, a plurality of guard rods projecting rearwardly from said plow and between said crushing and breaking disks, and adjustable and removable extensions to said rods.

5. A plow comprising a beam, a standard, a plow, a hollow land side at the outer end of said plow rearwardly projecting in a horizontal position, a second landside rearwardly projecting from the inner end of said plow, a rearwardly projecting plate near said second landside and forming a chamber therebetween, a plurality of shafts mounted between said land sides, a pair of gear wheels mounted within the hollow portion of said first mentioned landside upon said shafts, connecting driving means between said driving gear wheels, a driving wheel mounted between said second mentioned landside and said plate, and driving means thereto.

In testimony whereof I have signed my name to this specification in the presence of two subscribing witnesses.

MORGAN C. FRENCH.

Witnesses:
E. H. GODFREY,
W. W. CHANDLER.